United States Patent
Huh et al.

(10) Patent No.: US 10,880,790 B2
(45) Date of Patent: Dec. 29, 2020

(54) METHOD AND DEVICE FOR TRANSMITTING DATA IN WIRELESS COMMUNICATION SYSTEM SUPPORTING DUAL CONNECTIVITY

(71) Applicant: Pantech Corporation, Seoul (KR)

(72) Inventors: Kang Suk Huh, Seoul (KR); Ki Bum Kwon, Seoul (KR); Jae Hyun Ahn, Seoul (KR); Myung Cheul Jung, Seoul (KR)

(73) Assignee: PANTECH CORPORATION, Seoul (KR)

( * ) Notice: Subject to any disclaimer, the term of this patent is extended or adjusted under 35 U.S.C. 154(b) by 259 days.

(21) Appl. No.: 14/890,403

(22) PCT Filed: May 9, 2014

(86) PCT No.: PCT/KR2014/004185
§ 371 (c)(1),
(2) Date: Nov. 10, 2015

(87) PCT Pub. No.: WO2014/182132
PCT Pub. Date: Nov. 13, 2014

(65) Prior Publication Data
US 2016/0119826 A1   Apr. 28, 2016

(30) Foreign Application Priority Data
May 10, 2013   (KR) .................. 10-2013-0053407

(51) Int. Cl.
*H04W 36/00*   (2009.01)
*H04W 36/04*   (2009.01)
(Continued)

(52) U.S. Cl.
CPC ....... *H04W 36/0044* (2013.01); *H04W 36/04* (2013.01); *H04W 36/38* (2013.01); *H04W 76/15* (2018.02); *H04W 92/20* (2013.01)

(58) Field of Classification Search
None
See application file for complete search history.

(56) References Cited

U.S. PATENT DOCUMENTS

2009/0149189 A1* 6/2009 Sammour ............ H04L 1/165
 455/450
2009/0196252 A1* 8/2009 Fischer ............... H04L 1/0031
 370/331

(Continued)

FOREIGN PATENT DOCUMENTS

EP   2 421 324   2/2012

OTHER PUBLICATIONS

International Search Report dated Jul. 29, 2014, in International Application No. PCT/KR2014/004185.

(Continued)

*Primary Examiner* — Jason E Mattis
*Assistant Examiner* — Hong Shao
(74) *Attorney, Agent, or Firm* — Capitol IP Law Group, PLLC

(57) ABSTRACT

Disclosed are a method and a device for transmitting data in a wireless communication system supporting dual connectivity. The method for transmitting data in a wireless communication system supporting dual connectivity comprises the steps of: transmitting channel state information between a small base station and a terminal to a macro base station; receiving a radio resource control (RRC) connection reconfiguration message from the macro base station; releasing a connection with the small base station on the basis of the RRC connection reconfiguration message; and transmitting, to the macro base station, a PDCP state report including information on a sequence number of a packet data convergence protocol (PDCP) service data unit (SDU) which has not been received.

15 Claims, 9 Drawing Sheets

(51) Int. Cl.
H04W 36/38 (2009.01)
H04W 76/15 (2018.01)
H04W 92/20 (2009.01)

(56) References Cited

U.S. PATENT DOCUMENTS

2012/0082082 A1    4/2012  Etemad et al.
2012/0106510 A1    5/2012  Kuo
2013/0083661 A1    4/2013  Gupta et al.
2016/0021581 A1*   1/2016  Deenoo ............ H04W 36/0055
                                                  370/331

OTHER PUBLICATIONS

Written Opinion of the International Searching Authority dated Jul. 29, 2014 in International Application No. PCT/KR2014/004185.
Office Action dated Mar. 7, 2019 issued in Korean Patent Application No. 10-2013-0053407.
Huawei, HiSilicon, "Study of Solutions and Radio Protocol Architecture for Dual-Connectivity", 3GPP TSG-RAN WG2 Meeting #81bis, R2-131164, 2013. 4. 6.
LG Electronics Inc., "UP Radio Protocol for Dual Connectivity", 3GPP TSG-RAN2 Meeting #81bis, R2-131231, 2013. 4. 5.

* cited by examiner

METHOD AND DEVICE FOR TRANSMITTING DATA IN WIRELESS COMMUNICATION SYSTEM SUPPORTING DUAL CONNECTIVITY

CROSS-REFERENCE TO RELATED APPLICATIONS

This application is a National Stage Entry of International Application PCT/KR2014/004185, filed on May 9, 2014, and claims priority from and the benefit of Korean Patent Application No. 10-2013-0053407 filed on May 10, 2013, each of which is hereby incorporated by reference for all purposes as if fully set forth herein.

BACKGROUND

Field

The present invention relates to wireless communications and, more particularly, to a data transmission and device in a wireless communication system supporting dual connectivity.

Discussion of the Background

A cellular is a concept proposed to overcome a restriction to a service area and the limits of the frequency and subscriber capacities. A cellular is a method of providing coverage by changing a single high-output base station to a plurality of low-output base stations. That is, a mobile communication service area is divided into several small cells, different frequencies are allocated to neighboring cells, and the same frequency band is used in two cells not having interference therebetween because they are sufficiently spaced apart from each other, so the frequency is spatially reused. Alternatively, a method of dividing a mobile communication service area into several small cells, allocating the same frequency to neighboring cells, but controlling the cells in order to remove interference between the cells may also be used.

Meanwhile, in a specific area, such as a hotspot within a cell, many communication demands are specially generated. In a specific area, such as a cell edge or a coverage hole, reception sensitivity of radio waves may be deteriorated. As the wireless communication technology is advanced, small cells, for example, a pico cell, a femto cell, a micro cell, a remote radio head (RRH), a relay, and a repeater are together installed within a macro cell in order to enable communication in an area, such as a hotspot, a cell edge, or a coverage hole. The small cells may be placed in the outside or inside the macro cell. In this case, the small cell is placed at the location where the macro cell is not reached, in the inside of a house, or in an office. Such a network is called a heterogeneous network (HetNet). In this case, the heterogeneous network does not need to use a different radio access method. In a heterogeneous network environment, a macro cell is a cell having relatively large coverage, and a small cell, such as a femto cell or a pico cell, is a cell having relatively small coverage. The macro cell and the small cell may distribute the same traffic, or each of which may be responsible for the transmission of traffic having different QoS. In a heterogeneous network environment, coverage overlap is generated between a plurality of macro cells and small cells.

In a heterogeneous network environment, a dual connectivity scheme has been introduced as one of cell planning schemes for distributing an excessive load or a load required by specific QoS to a small cell without a handover procedure and efficiently sending data. From a viewpoint of a terminal, dual connectivity may be a scheme for providing a more efficient method in terms of a transmission/reception transfer rate. For example, a terminal may send/receive services to/from two or more serving cells. In this case, each of the serving cells may belong to a different base station. In the area in which coverage of a macro cell overlaps coverage of a small cell as described above, a terminal may simultaneously connect (or signaling connection) to the macro cell and the small cell or may simultaneously use (or user traffic transmission) the macro cell and the small cell. This may be called dual connectivity. That is, the terminal may be wirelessly connected to two or more different base stations (e.g., a macro base station including a macro cell and a small base station including a small cell) through different frequency bands based on the dual connectivity scheme and may send/receive services to/from the two or more different base stations. Alternatively, the terminal may be wirelessly connected to two or more different base stations through the same frequency band and may send/receive services to/from the two or more different base stations.

A terminal supporting dual connectivity can maintain two radio links because it may simultaneously use a macro cell and a small cell. If connection between a small base station and a terminal is released while data is transmitted from a macro base station and the small base station to the terminal based on dual connectivity, an unnecessary reduction in transmission efficiency of TCP packets may occur. There is a need for a method for preventing such an unnecessary reduction in transmission efficiency of TCP packets.

SUMMARY

An object of the present invention is to provide a method of receiving data again in a wireless communication system supporting dual connectivity.

Another object of the present invention is to provide a method of retransmitting data in a wireless communication system supporting dual connectivity.

Yet another object of the present invention is to provide a device for performing a method of receiving data again in a wireless communication system supporting dual connectivity.

Yet another object of the present invention is to provide a device for performing a method of retransmitting data in a wireless communication system supporting dual connectivity.

Technical Solution

In accordance with an aspect of the present invention, there is provided a method of receiving, by user equipment, data again in a wireless communication system supporting dual connectivity. The method of receiving data again includes the steps of receiving a part of packet data convergence protocol (PDCP) service data units (SDU) from a small eNB, sending information about the channel state between the small eNB and the user equipment to a macro eNB, receiving a radio resource control (RRC) connection reconfiguration message from the macro eNB, releasing connection with the small eNB based on the RRC connection reconfiguration message, and sending a PDCP status report including information about the sequence number of at least one PDCP SDU not received due to the release of the connection with the small eNB to the macro eNB.

In accordance with another aspect of the present invention, there is provided a method of retransmitting, by a macro eNB, data in a wireless communication system supporting dual connectivity. The method of retransmitting data includes the steps of sending a part of PDCP SDUs to the radio link control (RLC) layer of a small eNB, receiving information about the channel state between user equipment and the small eNB from the user equipment, determining whether to release connection between the user equipment and the small eNB based on the information about the channel state, sending a radio resource control (RRC) connection reconfiguration message to the user equipment if it is determined that the connection between the user equipment and the small eNB is released, and receiving a PDCP status report including information about the sequence number of at least one PDCP SDU not received by the user equipment from the user equipment.

In accordance with yet another aspect of the present invention, there is provided user equipment receiving data again in a wireless communication system supporting dual connectivity data. The user equipment includes a reception unit receiving a part of packet data convergence protocol (PDCP) service data units (SDU) from a small eNB, a processor generating information about the channel state between the small eNB and the user equipment, a transmission unit sending the information about the channel state to a macro eNB. The reception unit receives a radio resource control (RRC) connection reconfiguration message from the macro eNB. The processor releases connection with the small eNB based on the RRC connection reconfiguration message and generates a PDCP status report including information about the sequence number of at least one PDCP SDU which has not been received. The transmission unit sends the PDCP status report to the macro eNB. The PDCP SDUs are received by the macro eNB over an external packet data network. The part of the PDCP SDUs are received by the reception unit through a radio link control (RLC) layer of the small eNB.

In accordance with the present invention, a reduction in the transfer rate of a transmission control protocol (TCP) packet which may unnecessarily occur if connection between UE and a small cell is released while data is transmitted and received between a macro cell and the UE and between the small cell and the UE based on dual connectivity can be prevented.

DETAILED DESCRIPTION OF THE ILLUSTRATED EMBODIMENTS

Figure 1:
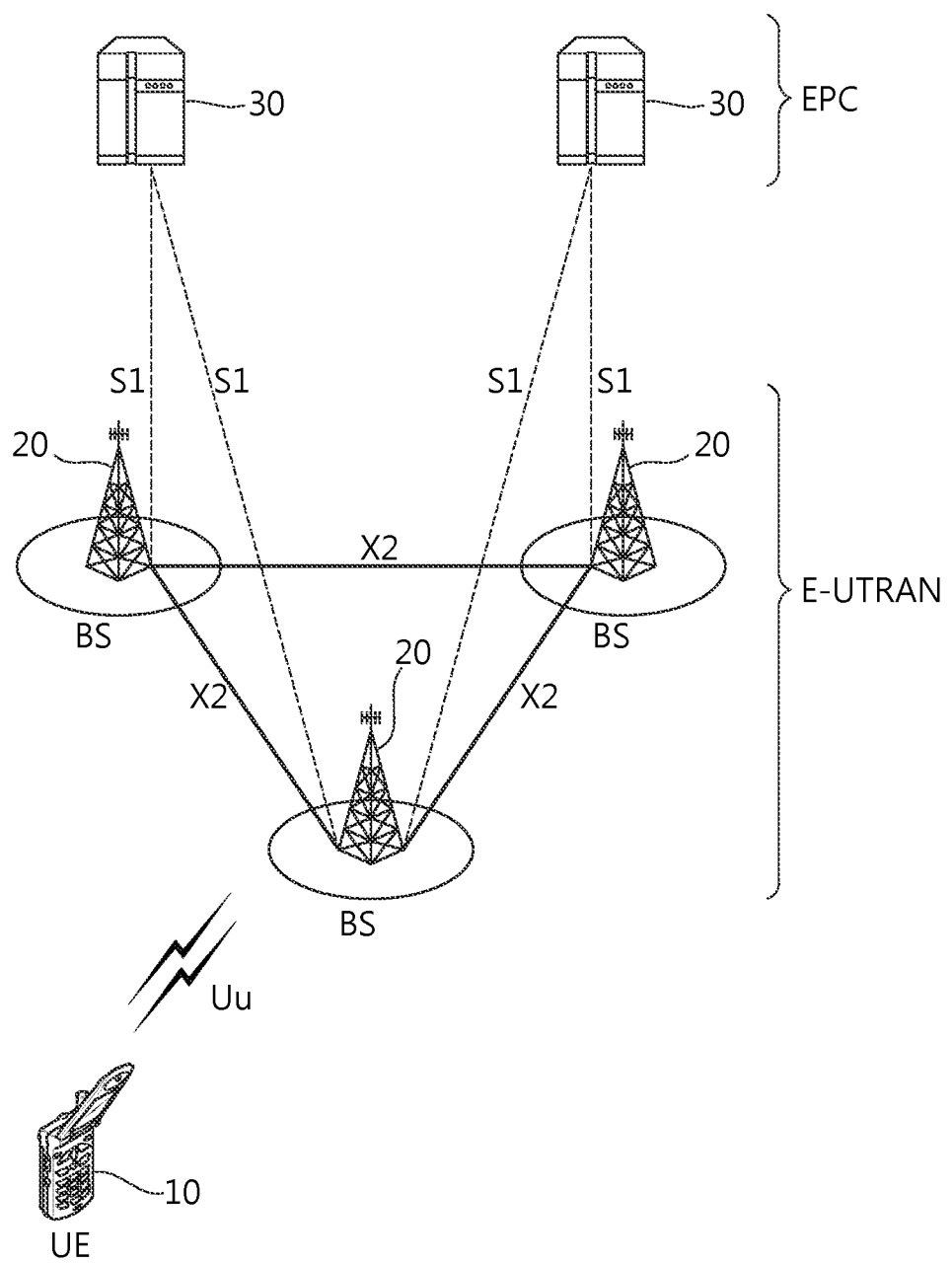
FIG. 1 shows a wireless communication system to which the present invention is applied.

Hereinafter, in this specification, some embodiments will be described in detail with reference to exemplary drawings. It is to be noted that in assigning reference numerals to elements in the drawings, the same reference numerals denote the same elements throughout the drawings even in cases where the elements are shown in different drawings. Furthermore, in describing the embodiments of this specification, a detailed description of the known functions and constitutions will be omitted if it is deemed to make the gist of the present invention unnecessarily vague.

Furthermore, in this specification, a wireless communication network is described as a target, and tasks performed in the wireless communication network may be performed in the process in which a system (e.g., a base station) managing the corresponding wireless communication network controls the network and sends data or may be performed by a terminal which is combined with the corresponding wireless communication network.

FIG. 1 shows a wireless communication system to which the present invention is applied. The wireless communication system may be the network structure of an evolved-universal mobile telecommunications system (E-UMTS). The E-UMTS system may also be called a long term evolution (LTE) or LTE-advanced (LTE-A) system. The wireless communication systems are widely deployed in order to provide various communication services, such as voice and packet data.

Meanwhile, multiple access schemes applied to the wireless communication system are not limited. Various multiple access schemes, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA, may be used.

In this case, in uplink transmission and downlink transmission, a time division duplex (TDD) method of performing transmission using different times may be used, or a frequency division duplex (FDD) method of performing transmission using different frequencies may be used.

Referring to FIG. 1, an E-UTRAN includes a base station (BS) 20 which provides a control plane and a user plane to user equipment (UE) 10. The user plane is a protocol stack for user data transmission, and the control plane is a protocol stack for control signal transmission. The UE 10 may be fixed or may have mobility and may be called a different term, such as a mobile station (MS), an advanced MS (AMS), a user terminal (UT), a subscriber station (SS), or a wireless device.

The BS 20 commonly refers to a station communicating with the UE 10 and may be called a different term, such as an evolved-NodeB (eNB), a base transceiver system (BTS), an access point, a femto-eNB, a pico-eNB, a home eNB, or a relay. The eNB 20 may provide at least one cell to UE. The cell may mean a geographical area in which the eNB 20 provides communication services or may mean a specific frequency band. The cell may mean downlink frequency resources and uplink frequency resources. Alternatively, the cell may mean a combination of downlink frequency resources and optional uplink frequency resources.

The eNBs 20 may be connected through an X2 interface. The eNB 20 is connected to an evolved packet core (EPC) 30 through an S1 interface. More specifically, the eNB 20 is connected to a mobility management entity (MME) through an S1-MME and to a serving gateway (S-GW) through an S1-U. The S1 interface exchanges pieces of operation and management (OAM) information for supporting the mobility of the UE 10 by exchanging signals with the MME.

The EPC 30 includes the MME, the S-GW, and a packet data network-gateway (P-GW). The MME includes access information about the UE 10 or information about the capabilities of the UE 10. Such information is chiefly used in the mobility management of the UE 10. The S-GW is a gateway having the E-UTRAN as an end point, and the P-GW is a gateway having a packet data network (PDN) as an end point.

The E-UTRAN and the EPC 30 may be integrated and called an evolved packet system (EPS). A traffic flow up to a PDN for connection from a radio link through which the UE 10 accesses the eNB 20 to a service entity operates based on an Internet protocol (IP).

A radio interface between UE and an eNB is called a Uu interface. The layers of a radio interface protocol between the UE and a network may be classified into L1 (a first layer), L2 (a second layer), and L3 (a third layer) based on the lower three layers of an open system interconnection (OSI) reference model which has been widely known in communication systems. A physical (PHY) layer belonging to the first layer of the lower three layers provides information transfer services using physical channels. A radio resource control (RRC) layer placed in the third layer functions to control radio resources between the UE and the network. To this end, in an RRC layer, RRC messages are exchanged between the UE and the eNB.

The physical (PHY) layer provides information transfer services to an upper layer using a physical channel. The PHY layer is connected to a medium access control (MAC) layer (that is an upper layer) through a transport channel. Data is moved between the MAC layer and the PHY layer through the transport channel. The transport channel is classified depending on how data is transmitted through a radio interface according to what characteristic. Furthermore, data is moved through a physical channel between different PHY layers, that is, between the PHY layers of a transmitter and a receiver. The physical channel may be modulated according to an orthogonal frequency division multiplexing (OFDM) method and uses time and a frequency as radio resources. There are some physical control channels. A physical downlink control channel (PDCCH) notifies UE of the resource allocation of a paging channel (PCH) and a downlink shared channel (DL-SCH) and hybrid automatic repeat request (HARM) information related to the DL-SCH. The PDCCH may carry an uplink scheduling grant which notifies UE of the resource allocation of uplink transmission. A physical control format indicator channel (PCFICH) notifies UE of the number of OFDM symbols used in PDCCHs and is transmitted for each subframe. A physical hybrid ARQ indicator channel (PHICH) carries HARQ ACK/NAK signals in response to uplink transmission. A physical uplink control channel (PUCCH) carries uplink control information, such as HARQ ACK/NAK, a scheduling request, and CQI for downlink transmission. A physical uplink shared channel (PUSCH) carries an uplink shared channel (UL-SCH).

The functions of the MAC layer include mapping between a logical channel and a transport channel and multiplexing/demultiplexing in a transport block provided as a physical channel on the transport channel of an MAC service data unit (SDU) belonging to a logical channel. The MAC layer provides a service to a radio link control (RLC) layer through a logical channel. The logical channel may be divided into a control channel for transferring control region information and a traffic channel for transferring user domain information.

The functions of the RLC layer include the concatenation, segmentation, and reassembly of an RLC SDU. In order to guarantee a pieces of various quality of service (QoS) necessary for a radio bearer (RB), the RLC layer provides three types of operation mode, such as transparent mode (TM), unacknowledged mode (UM)m and acknowledged mode (AM). AM RLC provides error correction through an automatic repeat request (ARQ).

The functions of a packet data convergence protocol (PDCP) layer in a user plane includes the transfer, header compression, and ciphering of user data. The functions of a packet data convergence protocol (PDCP) layer in a control plane include the transfer and encryption/integrity protection of control plane data.

The RRC layer is related to the configuration, reconfiguration, and release of RBs and is responsible for control of logical channels, transport channels, and physical channels. An RB means a logical path provided by the first layer (PHY layer) and the second layer (the MAC layer, the RLC layer, the PDCP layer) in order to transfer data between UE and a network. The configuration of an RB means the process of defining the characteristics of a radio protocol layer and a channel in order to provide a specific service and configuring each detailed parameter and operating method. An RB may be divided into a signaling RB (SRB) and a data RB (DRB). The SRB is used as a passage through which an RRC message and an NAS message are transmitted in a control plane. The DRB is used as a passage through which user data is transmitted in a user plane.

A non-access stratum (NAS) layer placed higher than the RRC layer performs functions, such as session management and mobility management.

If RRC connection is present between the RRC layer of UE and the RRC layer of an E-UTRAN, the UE is in RRC connected mode. If not, the UE is in RRC idle mode.

In a heterogeneous network environment in which macro cells and small cells are together deployed, the small cell is advantageous compared to the macro cell in terms of the throughput which may be provided to a single piece of UE because the small cell provides services to an area smaller than the area of the macro cell. However, UE once connected to a macro cell is unable to receive a service from a small cell without performing handover although it is placed in the service area of the small cell. Furthermore, there are problems in that handover may be frequently generated because the small cell has small coverage although the UE is connected to the small cell through handover while moving and this is not preferred in terms of network efficiency.

Accordingly, in a heterogeneous network environment, a dual connectivity scheme has been introduced as one of cell planning schemes for distributing an excessive load or a load required by specific QoS to a small cell without a handover procedure and efficiently transmitting data. From a viewpoint of UE, dual connectivity may be a scheme for a more efficient method in terms of a transmission/reception transfer rate. For example, UE may send/receive services to/from two or more serving cells. In this case, each of the serving cells may belong to a different eNB. The UE may be wirelessly connected to two or more different eNBs (e.g., a macro eNB including a macro cell and a small eNB including a small cell) through different frequency bands based on the dual connectivity scheme and may send/receive services to/from the two or more different eNBs. Alternatively, the UE may be wirelessly connected to two or more different eNBs through the same frequency band and may send/receive services to/from the two or more different eNBs.

A dual connectivity situation is described below.

UE may receive services through different frequency bands from a small eNB including only at least one small cell and a macro eNB including only at least one macro cell. An eNB having low transmission power, such as a small eNB, is also called a low power node (LPN). RRC for maintaining connection mode with the UE may be present in the macro eNB or the small eNB. In the following contents, it is assumed that RRC for maintaining connection mode with UE is present in a macro eNB.

Figure 2:
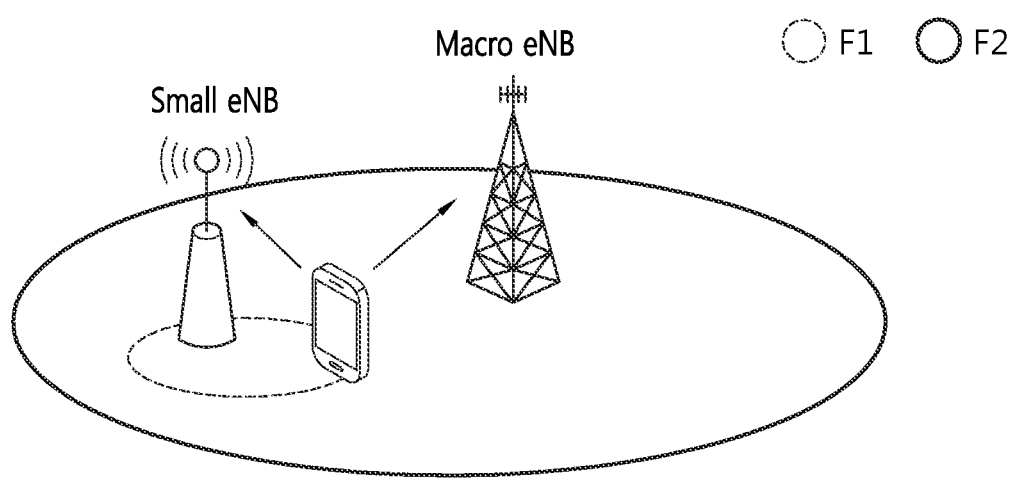
FIG. 2 shows an example of the dual connectivity situation of UE applied to the present invention.

FIG. 2 shows an example of the dual connectivity situation of UE applied to the present invention.

Referring to FIG. 2, an F2 frequency band is allocated to a macro eNB, and an F1 frequency band is allocated to a small eNB. UE is in a situation in which the UE may send/receive a service through the small cell using the F1 frequency band from the small eNB while sending/receiving a service through the macro cell using the F2 frequency band from the macro eNB. As described above, the UE supporting dual connectivity may simultaneously use the macro cell of the macro eNB and the small cell of the small eNB and requires individual radio link control because radio links are respectively configured between the UE and the macro eNB (or the macro cell) and between the UE and the small eNB (or the small cell).

Figure 3:
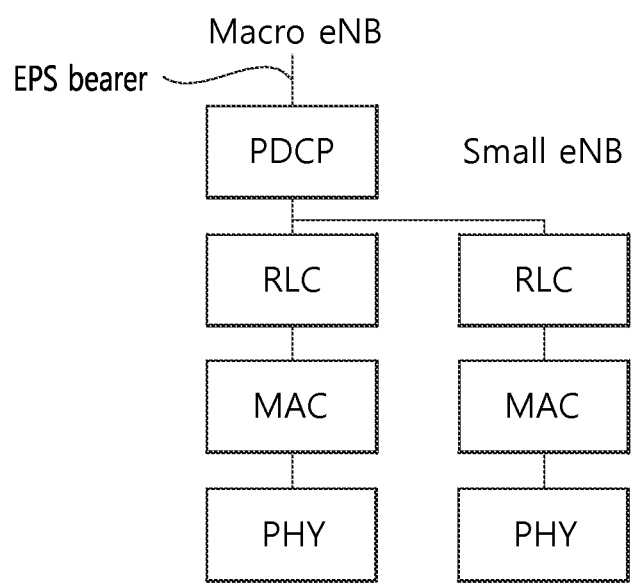
FIG. 3 shows an example of a logical path setup for a macro eNB and a small eNB in the dual connectivity situation of UE according to an embodiment of the present invention.

FIG. 3 shows an example of a logical path setup for a macro eNB and a small eNB in the dual connectivity situation of UE according to an embodiment of the present invention.

Referring to FIG. 3, the macro eNB includes a PDCP entity, an RLC entity, an MAC entity, and a PHY layer, but the small eNB includes an RLC entity, an MAC entity, and a PHY layer. RBs are respectively configured in the macro eNB and the small eNB with respect to a single EPS bearer, and a service is provided to the UE. That is, a service is provided to the UE through a flow #1 through the macro eNB and a flow #2 through the small eNB with respect to a single EPS bearer.

The PDCP entity of the macro eNB is connected to the RLC entity of the small eNB using an Xa interface protocol through a backhaul. In this case, the Xa interface protocol may be an X2 interface protocol defined between eNBs within an LTE system.

The UE may send/receive data services through both the RB #1 of the macro eNB and the RB #2 of the small eNB with respect to an EPS bearer.

Figure 4:
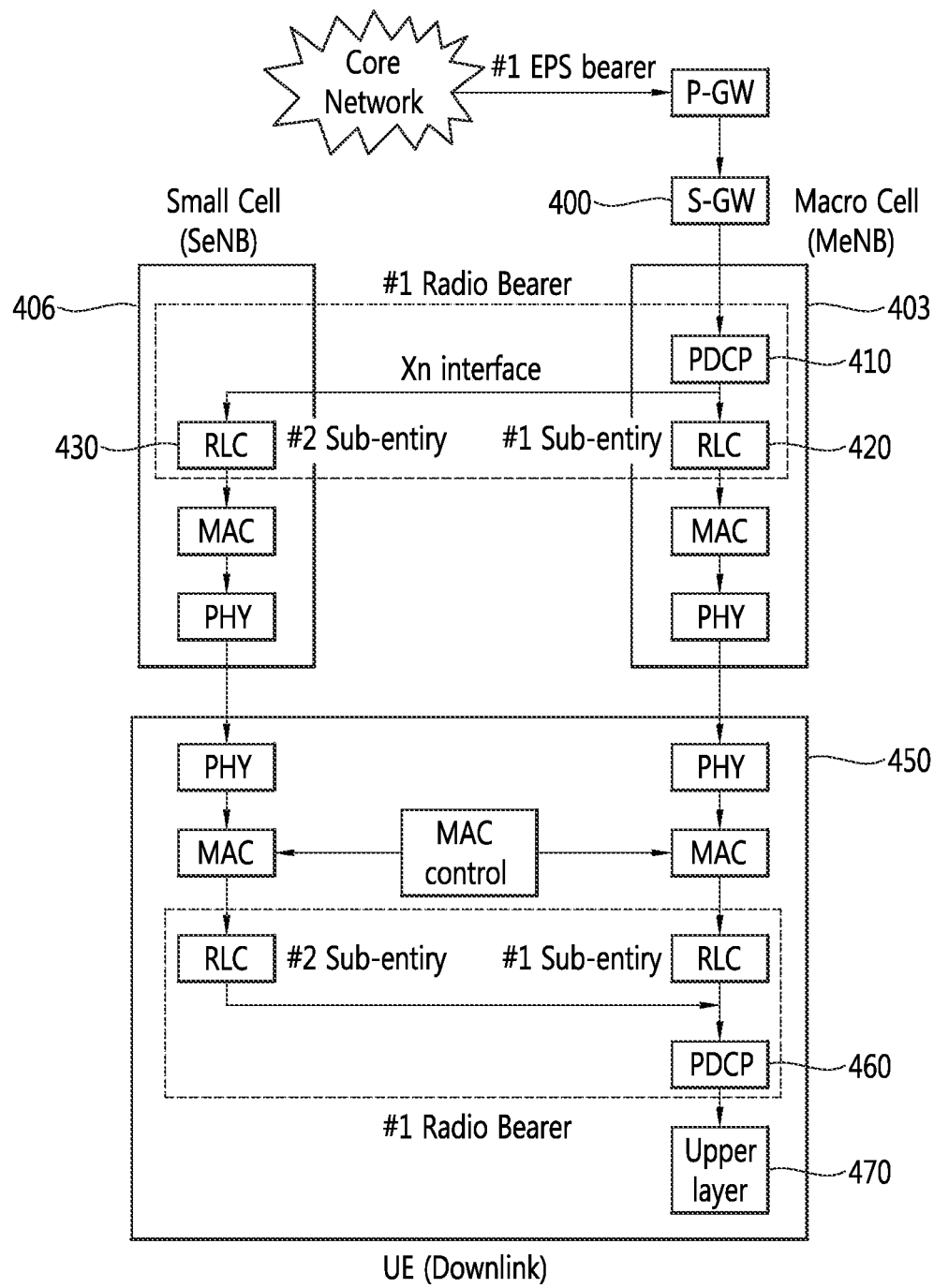
FIG. 4 is a conceptual diagram showing the structure of dual connectivity according to an embodiment of the present invention.

FIG. 4 is a conceptual diagram showing the structure of dual connectivity according to an embodiment of the present invention.

Referring to FIG. 4, a single radio bearer corresponding to a single EPS bearer may be separated from an RLC layer 420, that is, a lower layer of the PDCP layer 410 of a macro eNB. A PDCP SDU may be delivered to the RLC layer 420 of the macro eNB 403 and the RLC layer 430 of a small eNB 406 on the basis of the PDCP layer 410 of the macro eNB. That is, packet data transmitted through an S-GW 400 may be distributed and delivered to the RLC layer 420 of the macro eNB 403 and the RLC layer 430 of the small eNB 406. The PDCP SDU may be distributed on the basis of the sequence number of the PDCP SDU. For example, a PDCP SDU having a sequence number corresponding to an add number may be transmitted to UE 450 through the RLC layer 420 of the macro eNB 403. A PDCP SDU having a sequence number corresponding to an even number may be transmitted to the UE 450 through the RLC layer 420 of the small eNB 403. A data multi-transmission method for a single service based on such a dual connection method may be called a multi-flow method.

The UE 450 may receive data transmitted through the macro eNB 403 and the small eNB 406. The data transmitted by the two eNBs are merged in the PDCP layer 460 of the UE 450 and may be delivered to the upper layer 470 of the UE 450.

Hereinafter, an embodiment of the present invention discloses a data transmission and reception method between UE and a macro eNB if connection between a small eNB and the UE is released while data is transmitted from the macro eNB and the small eNB to the UE based on dual connectivity. If connection between a small eNB and UE is released while data is transmitted from a macro eNB and the small eNB to the UE based on dual connectivity, an unnecessary reduction in transmission efficiency of TCP packets may occur. Hereinafter, an embodiment of the present invention discloses a method of preventing an unnecessary reduction in transmission efficiency of TCP packets.

Figure 5:
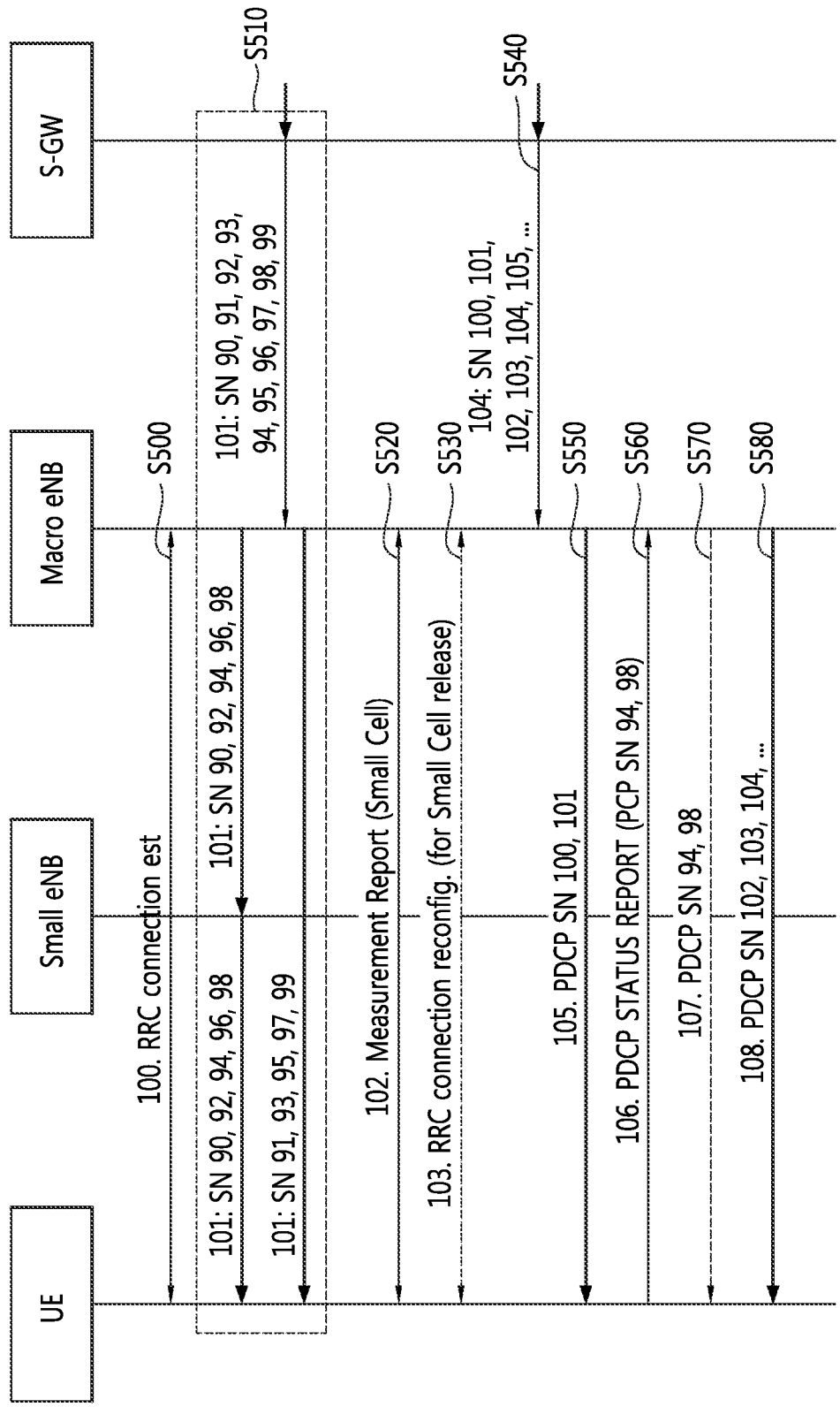
FIG. 5 is a conceptual diagram showing a data transmission and reception method if a small eNB is released while data is transmitted based on dual connectivity according to an embodiment of the present invention.

FIG. 5 is a conceptual diagram showing a data transmission and reception method if a small eNB is released while data is transmitted based on dual connectivity according to an embodiment of the present invention.

FIG. 5 discloses a connection configuration and a data transmission and reception method between UE, a small eNB, a macro eNB, and an S-GW.

RRC connection may be established between the macro eNB and the UE (S500).

When the RRC connection is established between the macro eNB and the UE, a configuration for the operation of a PDCP layer may be performed. If a backhaul set up between the macro eNB and the small eNB is a non-ideal backhaul, latency may be increased in sending data from the small eNB to the UE. For example, latency if a backhaul between the macro eNB and the small eNB is not ideal may be increased to 60 ms. Accordingly, for data transmission and reception between the eNB and the UE based on dual connectivity, a reduction of the transfer rate needs to be prevented by separately setting a PDCP discard timer with respect to a PDCP SDU transmitted to the small eNB.

The PDCP discard timer may be a timer performing the following operations.

The PDCP discard timer may be a timer for determining whether to discard a PDCP SDU and/or a PDCP PDU in the PDCP layer of a macro eNB. For example, the PDCP SDU may be received from the upper layer (e.g., an Internet protocol (IP) of the PDCP layer of the macro eNB. In this case, the PDCP discard timer may be started in each PDCP SDU. If a condition in which the PDCP discard timer is stopped is not present and when an operating PDCP discard timer expires, the macro eNB may discard the PDCP SDU and the PDCP PDU. Furthermore, when the PDCP discard timer expires, notification may be provided to the RLC layer so that it discards an RLC SDU. The RLC layer may discard the RLC SDU if any segment of the corresponding RLC SDU has not yet been mapped to the RLC PDU after notification is provided to the RLC layer so that it discards the RLC SDU.

Furthermore, when an RRC connection procedure is performed, the PDCP discard timer may determine whether UE will send PDCP status information (PDCP status report) to a macro eNB. For example, the value of an rlc-AM small cell release is true and connection between a small eNB and UE is released, the UE may send PDCP status information to the small eNB.

Table 1 below is an example of PDCP configuration information transmitted through an RRC message when RRC connection is established.

Table 1

TABLE 1

```
PDCF-Config ::=              SEQUENCE {
    discardTimer for macro cell    ENUMERATED {
                                     ms50, ms100, ms150, ms300, ms500,
                                     ms750, ms1500, infinity
    }                                       OPTIONAL,    --Cond Setup
    discardTimer for small cell    ENUMERATED {
                                     ms50, ms100, ms150, ms300, ms500,
                                     ms750, ms1500, infinity
    }                                       OPTIONAL,    --
    rlc-AM                        SEQUENCE {
        stausReportRequired          BOOLEAN
    }
    rlc small cell release        SEQUENCE {
        statusReportRequired         BOOLEAN
    }                                       OPTIONAL,    --
```

If PDCP data is transmitted through the small eNB and the macro eNB based on dual connectivity, the PDCP data may be transmitted to the macro eNB through the S-GW over an external packet data network. That is, the PDCP data may be transmitted from the S-GW to the PDCP layer of the macro eNB through a single EPS bearer. For example, it may be assumed that the sequence numbers of PDCP SDUs transmitted to the PDCP layer of the macro eNB are 90, 91, 92, 93, 94, 95, 96, 97, 98, and 99. The plurality of PDCP SDUs transmitted to the PDCP layer of the macro eNB may be divided and transmitted to the macro eNB and the small eNB (S510).

The PDCP layer of the macro eNB may distribute the PDCP SDUs to the respective eNBs based on the channel state between each eNB (the macro eNB and the small eNB) and the UE, for example. For example, the PDCP layer of the macro eNB may determine a ratio in which an optimal transfer rate can be obtained based on the channel state between the macro eNB and the UE and the channel state between the small eNB and the UE and may distribute the PDCP SDUs to the respective eNBs. The UE may measure a downlink channel state based on a reference signal transmitted by each eNB. The UE may feed the measured downlink channel state information back to each eNB in a specific cycle or continuously. For example, the channel state information between the small eNB and the UE may be fed back to the macro eNB or the small eNB and the macro eNB at the same time. For another example, after the channel state information between the small eNB and the UE is first fed back to the small eNB, the channel state information may be transmitted from the small eNB to the macro eNB based on the interface between the small eNB and the macro eNB.

The macro eNB may distribute the PDCP SDU to the RLC layer of each eNB based on the received channel state information between the small eNB and the UE and the received channel state information between the macro eNB and the UE. That is, the macro eNB may distribute and send the PDCP SDUs so that an eNB in a better channel state has a higher data rate than an eNB in a relatively poor channel state.

Hereinafter, in an embodiment of the present invention, for convenience of description, it is assumed that a PDCP SDU having a sequence number of an even number is distributed to the small eNB and a PDCP SDU having a sequence number of an add number is distributed to the macro eNB. That is, sequence numbers 90, 92, 94, 96, and 98 may be transmitted from the macro eNB to the small eNB and may be transmitted from the small eNB to the UE again.

Sequence numbers 91, 93, 95, 97, and 99 may be transmitted from the macro eNB to the UE.

The UE sends signal intensity information about the small eNB to the macro eNB (S520).

The UE may send a measurement report to the macro eNB. The measurement report may include signal intensity information between the UE and the small eNB. For example, if the UE deviates from coverage of the small eNB, signal intensity between the UE and the small eNB may become weak. The UE may send the measurement report to the macro eNB. The macro eNB may determine whether to release the connection between the UE and the small eNB based on the measurement report information.

The macro eNB sends an RRC connection reconfiguration message to the UE (S530).

The macro eNB may determine to release the connection between the small eNB and the UE. In this case, the macro eNB may release the connection between the small eNB and the UE by sending an RRC connection reconfiguration message to the UE. The UE may receive the RRC connection reconfiguration message and perform RLC re-establishment. When receiving the RRC connection reconfiguration message from the macro eNB, the RLY layer of the UE may reassemble RLC PDUs that have been successfully received with RLC SDUs and sequentially deliver the combined results to the PDCP layer in order of RLC sequence numbers. In contrast, the AM data (AMD) PDU of an RLC layer that has been incompletely received is discarded. In FIG. 5, it is assume that RLC SDUs corresponding to PDCP SDUs corresponding to the sequence numbers 94 and 98 have been incompletely received and discarded in the RLC layer.

The S-GW sends subsequent data to the macro eNB (S540).

The packet data network continues to send data to the PDCP layer of the macro eNB. For example, PDCP SDUs corresponding to sequence numbers 100, 101, 102, 103, and 104 may be transmitted from the packet data network to the PDCP layer of the macro eNB.

The macro eNB may send the PDCP SDUs transmitted by the packet data network to the UE (S550).

For example, the macro eNB may send the PDCP SDUs corresponding to the sequence numbers 100 and 101 to the UE.

The UE may send a PDCP status report to the macro eNB (S560).

The PDCP status report may be used for the UE to receive a PDCP SDU, not been received from a source cell, from a target cell when the UE performs handover from the source cell to the target cell. Furthermore, when connection between the small cell and the UE is released, the PDCP status report may be used for the UE to receive a PDCP SDU, not received from the small cell, from the macro cell. That is, in dual connectivity between the UE and the small cell and between the UE and the macro cell, when connection between the small cell and the UE is released, the PDCP status report may be used for the UE to receive a PDCP SDU, not received from the small cell, from the macro cell. Furthermore, when the UE moves to another small cell while maintaining dual connectivity with another small cell in dual connectivity between the UE and the small cell and between the UE and the macro cell, the PDCP status report may be used for the UE to receive a PDCP SDU, not received from a source small cell, from the macro cell or a target small cell.

The PDCP status report may include information about PDCP SDUs which have been received and not received by the UE. Information about a PDCP SDU not received by the UE may be transmitted to the macro eNB through a PDCP SDU that belongs to PDCP SDUs that have not been received and that has the smallest number and a bitmap generated based on the corresponding sequence number. For example, if the UE has not received PDCU SDUs corresponding to the sequence numbers 94 and 98, {94, 1, 1, 1, 0} may be included in the PDCP status report and transmitted. The UE may indicate a reception success (1) and non-reception (0) in the value (first missing SN: FMS) of a non-reception PDCP sequence number at the first (the smallest number) in the sequence of the sequence numbers of the PDCP SDU and each SN after the FMS and may send the PDCP status report to the PDCP layer of the eNB of the macro cell. That is, {94, 1, 1, 1, 0} means {94 (the smallest sequence number), 1(95), 1(96), 1(97), 0(98)}.

If the UE has not sent a PDCP status report to the macro eNB, a reduction of TCP performance may occur. In the PDCP layer of the macro eNB, the PDCP discard timer of each of the PDCP SDUs 94 and 98 not received by the UE may be operating. The PDCP layer of the macro eNB is unaware whether the UE has received a specific PDCP SDU until the PDCP discard timer expires. Accordingly, the macro eNB is unable to retransmit the PDCP SDUs, not received by the UE, to the UE.

The UE may receive the PDCP SDUs from the macro eNB again because the macro eNB may retransmit the PDCP SDUs if the macro eNB has been aware that the UE had not received the PDCP SDUs. However, since the macro eNB is unaware that the UE has not received the PDCP SDUs, it does not retransmit the PDCP SDUs although it is able to retransmit the PDCP SDUs. As a result, on the TCP transmission side, the retransmission timers of a TCP packet related to the PDCP SDUs not received by the UE expires. This is considered to be a loss of the corresponding TCP packet, and thus the window size of the TCP transmission side is reduced by half.

In this case, since the PDCP SDU buffer of the macro eNB is almost full, the TCP transfer rate is inevitably lowered although the PDCP SDUs may have been transmitted to the UE through the RLC stage until the PDCP discard timers expire. The reason for this is that a TCP transmission window size is reduced by half although it is not necessary to reduce the TCP transmission window size by half from a viewpoint of the TCP transmission side because the PDCP SDU buffer is almost full. That is, there may be a problem in that the TCP transfer rate is reduced although there is no problem attributable to the PDCP SDU buffer in delivering the TCP packet to the UE. Whenever a single TCP packet is considered to be a loss, the TCP transmission window is reduced by half. Accordingly, for example, if it is determined that three TCP packets have been reduced within a short time, the transfer rate may also be reduced to ⅛ because the TCP transmission window is reduced to ⅛. In order to solve such a problem, an embodiment of the present invention can prevent a problem in that the TCP transfer rate is unnecessarily reduced as described above by notifying the macro eNB of the sequence numbers of PDCP SDUs not received by the UE through the PDCP status report.

Furthermore, in accordance with an embodiment of the present invention, the PDCP status report may include information about a cause of the generation of the PDCP status report. For example, a cause of a cell release, that is, PDCP status report generation cause information, may be included in the PDCP status report in the form of a bit value, and transmitted. The PDCP status report generation cause may be represented based in several indices. For example, the index value 1 of the PDCP status report generation cause may indicate that the PDCP status report has been generated due to a cell release.

The macro eNB may be aware that a cause of the PDCP status report is that the connection between the small cell and the UE has been released on the basis of the PDCP status report generation cause included in the received PDCP status report while performing data transmission and reception based on dual connectivity. In this case, the macro eNB may selectively retransmit only PDCP SDUs that belong to PDCP SDUs included in the PDCP SDU buffer and that have been delivered to the small eNB.

Furthermore, the PDCP status report may additionally include cell information about whether the PDCP status report is a report attributable to the RLS re-establishment of which cell. That is, the PDCP status report may additionally include information about the cell identifier of the small cell. For example, the cell identifier information included in the PDCP status report may be a physical cell identifier (PCI).

In the aforementioned embodiment of the present invention, a method of preventing an unnecessary reduction of TCP performance based on a PDCP status report has been disclosed, but performance can be improved using the PDCP status report according to an embodiment of the present invention even in the case of a user datagram protocol (UDP) in addition to the TCP. That is, in the case of the TCP, the transfer rate reduction problem can be solved based on the PDCP status report transmitted by the UE. In the case of the UDP, QoS of data can be improved by reducing a loss of data of a real-time service (e.g., voice over LTE (VoLTE)) which is sensitive to delay.

The macro eNB may send PDCP SDUs, not received by the UE, to the UE (S570).

The macro eNB may be aware that the PDCP SDUs 94 and 98 that the UE had tried to send have not been transmitted through the small eNB based on the PDCP status information. The macro eNB may first send the PDCP SDUs 94 and 98 (non-reception data), not received by the UE, to the UE instead of the PDCP SNs 102, 103, . . . , that is, the buffer ring sequence of the PDCP SDUs.

The macro eNB may send the buffered PDCP SDUs to the UE (S580).

The macro eNB may send the PDCPs 102, 103, 104, ... to the UE in order in which the PDCPs 102, 103, 104, ... have been buffered in the PDCP SDU buffer.

Figure 6:
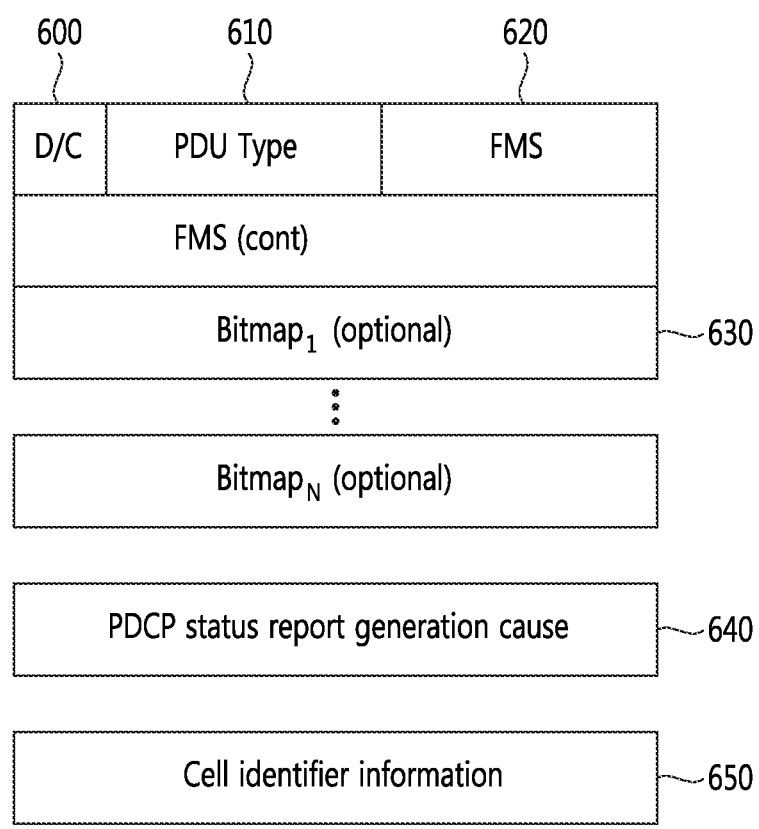
FIG. 6 is a conceptual diagram showing the information format of a PDCP status report according to an embodiment of the present invention.

FIG. 6 is a conceptual diagram showing the information format of a PDCP status report according to an embodiment of the present invention.

Referring to FIG. 6, the PDCP status report may include a D/C 600, a PDU type 610, an FMS 620, a bitmap 630, PDCP status report generation cause information 640, and cell identifier information 650.

The D/C 600 may include information about whether a PDU is a control PDU or a data PDU. For example, if the D/C 600 has a value of 1, it may be aware that a PDU is a control PDU. If the D/C 600 has a value of 0, it may be aware that a PDU is a data PDU.

The PDU type 610 may indicate that a current PDU has what type. For example, the PDU type 610 may indicate whether a current PDU is a PDCP status report based on the PDU type 610.

The FMS 620 may include information about the sequence number of a PDCP SDU that has not been first received by the UE as described above.

The bitmap 630 may include information about other PDCP SDUs, not received by the UE, in a bitmap based on the sequence number of the PDCP SDU that has not been first received by the UE as described above.

The PDCP status report generation cause information 640 may include information about a cause of the generation of a PDCP status report. The information about a cause of the generation of the PDCP status report may be transmitted in the form of a bit value based on a specific index. For example, if the PDCP status report generation cause included in the PDCP status report is a cell release between the small eNB and the UE, the information about a cause of the generation of the PDCP status report may correspond to an index 1. In this case, the PDCP status report generation cause information 640 may include a bit value corresponding to the index 1.

The PDCP status report may be generated for another cause. In this case, the PDCP status report generation cause information 640 may send information about a cause of the generation of the PDCP status report to the macro eNB based on a bit value.

The cell identifier information 650 may include information about the identifier of a released small cell. The cell identifier information may be the physical cell identifier (PCI) of a cell.

Both the PDCP status report generation cause information 640 and the cell identifier information 650 may be included in the PDCP status report, but only one of the PDCP status report generation cause information 640 and the cell identifier information 650 may be included in the PDCP status report. Hereinafter, for convenience of description, it is assumed that both the PDCP status report generation cause information 640 and the cell identifier information 650 are included in the PDCP status report.

Figure 7:
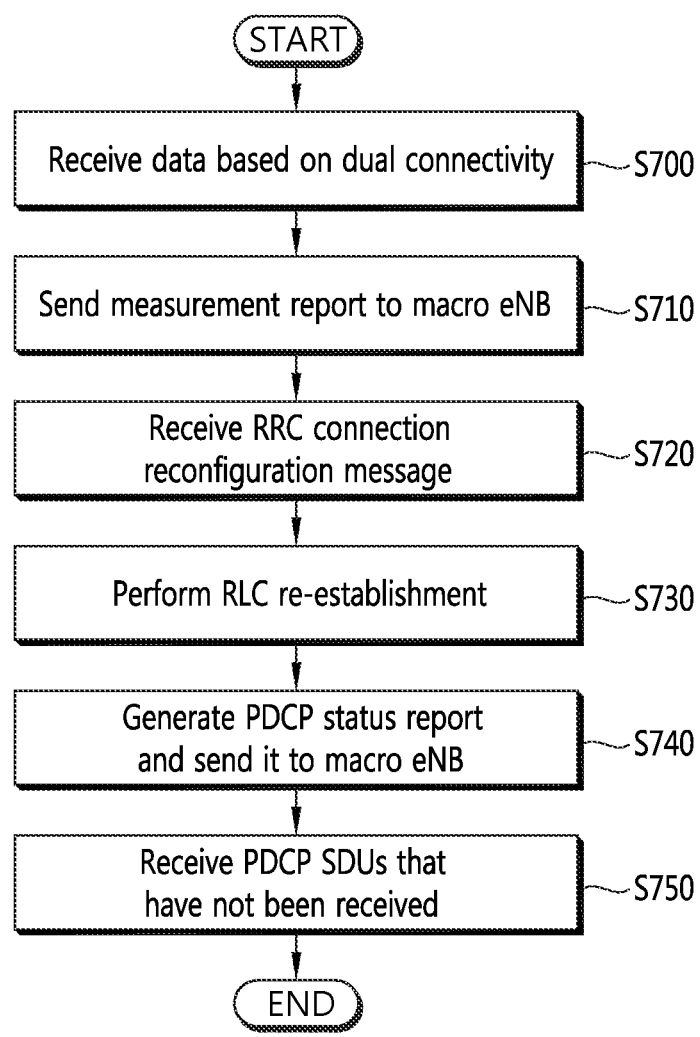
FIG. 7 is a flowchart showing an operation of UE according to an embodiment of the present invention.

FIG. 7 is a flowchart showing an operation of UE according to an embodiment of the present invention.

FIG. 7 discloses a method of sending, by UE, a PDCP status report.

Referring to FIG. 7, the UE receives data from a macro eNB and a small eNB based on dual connectivity (S700).

As described above, PDCP SDUs transmitted through the PDCP layer of the macro eNB may be distributed to the RLC layers of the macro eNB and the small eNB through a single EPS bearer. The distributed PDCP SDUs may be transmitted to the UE through the macro eNB and the small eNB.

The UE sends a measurement report to the macro eNB (S710).

The UE may send downlink channel state information between the small eNB and the UE to the macro eNB through the measurement report.

The macro eNB may determine whether to release connection between the small eNB and the UE based on the measurement report. For example, if a downlink signal is a specific intensity or less, the macro eNB may release connection between the small eNB and the UE. For example, if the UE deviates from coverage of the small eNB, the data transfer rate may be reduced because intensity of a signal transmitted from the small eNB to the UE through a downlink channel is reduced. In this case, the macro eNB may release connection between the small eNB and the UE.

The UE receives an RRC connection reconfiguration message transmitted by the macro eNB (S720).

If the channel state between the small eNB and the UE is not good, the macro eNB may release connection between the small eNB and the UE by sending an RRC connection reconfiguration message.

The UE performs RLC re-establishment (S730).

The UE which has received the RRC connection reconfiguration message may perform RLC re-establishment. The UE may sequentially deliver RLC PDUs that have been successfully received to the PDCP layer in order of the sequence numbers of the RLC PDUs based on the RLC layer through the RLC re-establishment. When the RLC re-establishment is performed, an RLC PDU that has been incompletely received is discarded.

The UE generates a PDCP status report and sends it to the macro eNB (S740).

The PDCP status report transmitted by the UE may include information about PDCP SDUs that have not been received, PDCP status report generation cause information, and cell identifier information as in FIG. 6. When the UE sends the PDCP status report information to the macro eNB, a performance reduction problem generated because the connection between the UE and the small eNB is broken and thus PDCP SDUs that need to be received by the UE through the small eNB are not rapidly received can be solved.

The UE receives the PDCP SDUs that have not been received (S750).

The macro eNB may retransmit the PDCP SDUs that have not been received by the UE on the basis of the PDCP status report.

Figure 8:
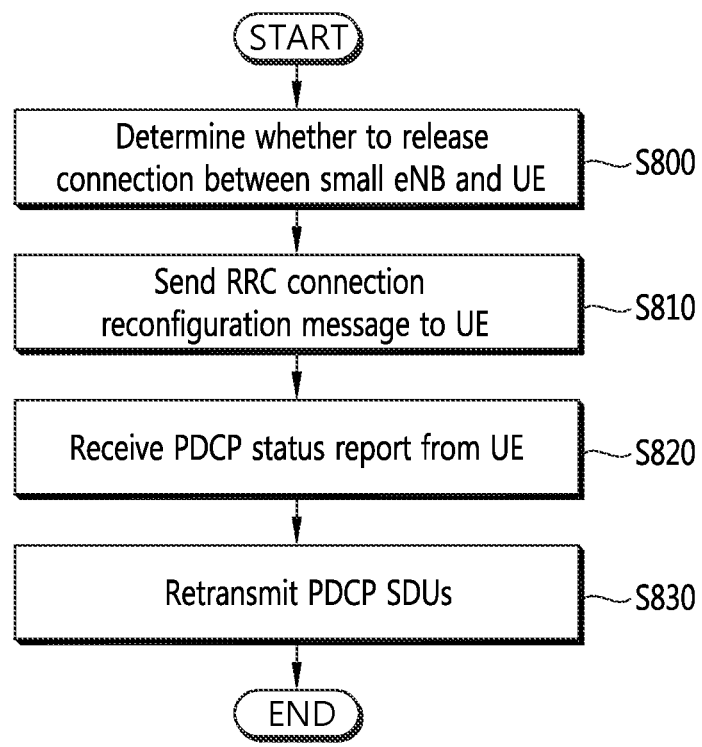
FIG. 8 is a flowchart showing an operation of a macro eNB according to an embodiment of the present invention.

FIG. 8 is a flowchart showing an operation of a macro eNB according to an embodiment of the present invention.

Referring to FIG. 8, the macro eNB determines whether to release connection between a small eNB and UE based on a measurement report transmitted by the UE (S800).

The measurement report may include channel state information between the small eNB and the UE. For example, if intensity of a signal transmitted from the small eNB to the UE is a specific threshold or less, the macro eNB may determine whether to release connection between the small eNB and the UE. This is one example in which the macro eNB determines whether to release connection between the small eNB and the UE. The macro eNB may determine whether to release connection between the small eNB and the UE using another method. For example, the macro eNB may determine whether to release connection between the small eNB and the UE based on another criterion other than the measurement report. Hereinafter, it is assumed that the macro eNB determines to release connection between the small eNB and the UE.

The macro eNB send an RRC connection reconfiguration message to the UE (S810).

Connection between the UE and the small eNB may be released based on the RRC connection reconfiguration message transmitted by the macro eNB. The UE may perform RLC re-establishment after receiving the RRC connection reconfiguration message.

The macro eNB receives a PDCP status report from the UE (S820).

The macro eNB may obtain information about the sequence numbers of PDCP SDUs not received by the UE, PDCP status report generation cause information, and cell identifier information based on the PDCP status report transmitted by the UE.

The macro eNB retransmits the PDCP SDUs, not received by the UE, based on the received PDCP status report (S830).

The macro eNB may retransmit the PDCP SDUs not received by the UE, based on the information about the sequence numbers of the PDCP SDUs not received by the UE.

Figure 9:
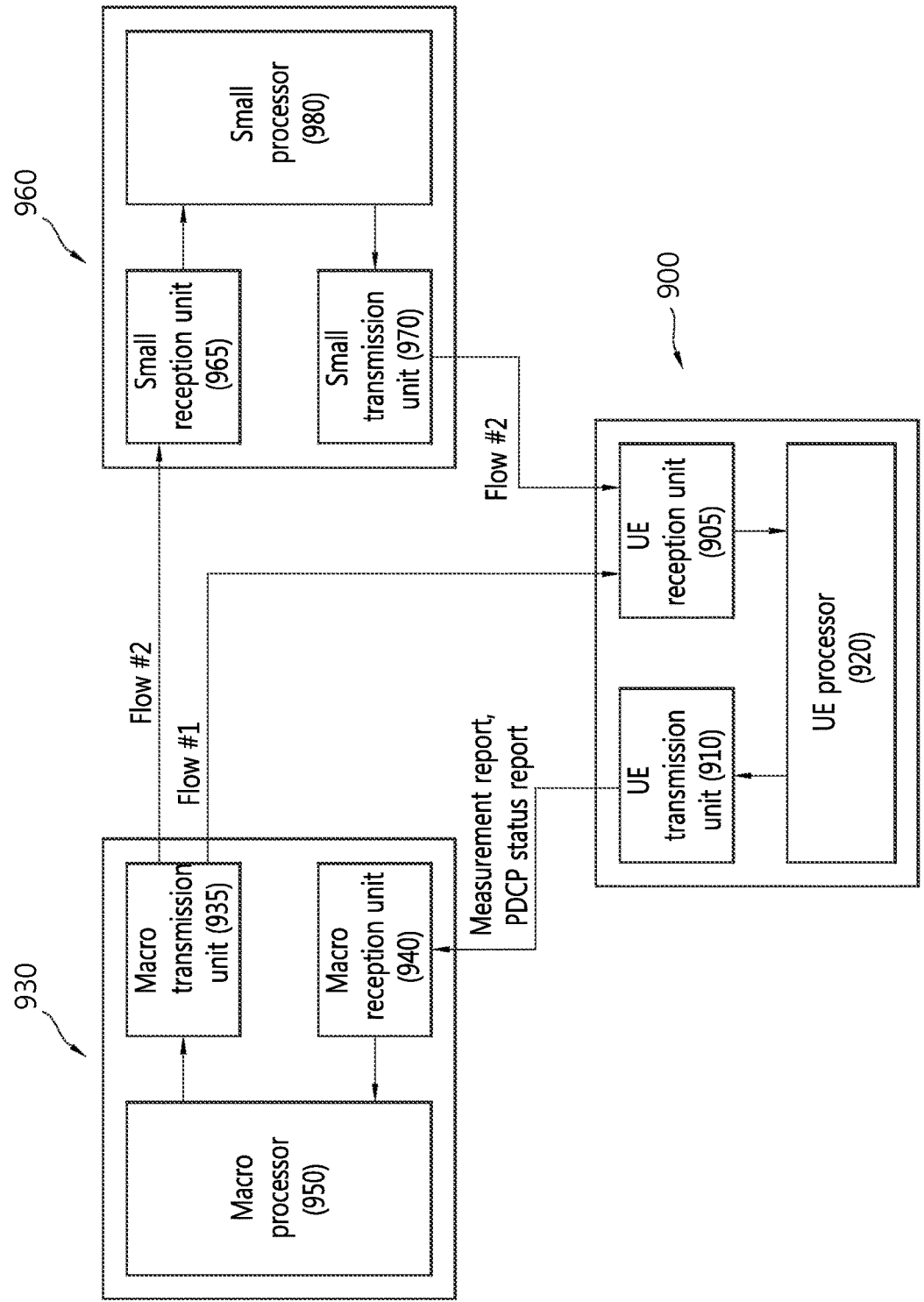
FIG. 9 is a block diagram of UE, a macro eNB, and a small eNB which perform radio link control in a wireless communication system supporting dual connectivity according to the present invention.

FIG. 9 is a block diagram of UE, a macro eNB, and a small eNB which perform radio link control in a wireless communication system supporting dual connectivity according to the present invention.

Referring to FIG. 9, dual connectivity may be configured between UE 900 according to the present invention and a macro eNB 930 and a small eNB 960. The UE 900 includes a UE reception unit 905, a UE transmission unit 910, and a UE processor 920. The UE processor 920 performs required functions and control so that the aforementioned characteristics of the present invention are implemented.

The UE processor 920 may generate a measurement report based on information about the channel state between the small eNB 960 and the UE 900. Furthermore, when connection between the small eNB 960 and the UE 900 is released, the UE processor 920 may generate a PDCP status report.

The UE transmission unit 910 may send the measurement report and the PDCP status report to the macro eNB 930.

The UE reception unit 905 may receive data transmitted by the small eNB 960 and the macro eNB 930.

The macro eNB 930 includes a macro transmission unit 935, a macro reception unit 940, and a macro processor 950.

The macro reception unit 940 may receive the measurement report and the PDCP status report transmitted by the UE.

The macro processor 950 may determine whether to release connection between the small eNB and the UE based on the measurement report transmitted by the UE 900. Furthermore, the macro processor 950 may determine whether to retransmit PDCP SDUs not received by the UE 900 based on the received PDCP status report.

The macro transmission unit 935 may retransmit the PDCP SDUs not received by the UE 900.

Furthermore, the small eNB 960 includes a small reception unit 965, a small transmission unit 970, and a small processor 980.

The small reception unit 965 may receive data transmitted by the macro eNB 930. Furthermore, the small reception unit 965 may be connected to the UE 900 and may send and receive data.

The small processor 980 may determine a data rate at which data will be transmitted to the UE 900 based on the channel state information transmitted by transmitted by the UE.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims. Accordingly, the present invention should be construed as covering all modifications or variations derived from the meaning and scope of the appended claims and their equivalents.

The invention claimed is:

1. A method of receiving, by user equipment, data again in a wireless communication system supporting dual connectivity, the method comprising:
   receiving, from a small evolved-NodeB (eNB), a part of packet data convergence protocol (PDCP) service data units (SDUs);
   sending, to a macro eNB, information about a channel state between the small eNB and the user equipment;
   receiving, from the macro eNB, a radio resource control (RRC) connection reconfiguration message;
   releasing connection with the small eNB based on the RRC connection reconfiguration message; and
   sending, to the macro eNB, a PDCP status report comprising information about a sequence number of at least one PDCP SDU not received due to the release of the connection with the small eNB;
   Wherein:
   the PDCP status report further comprises at least one of PDCP status report generation cause information and cell identifier information,
   the PDCP status report generation cause information comprises information about a cause of a generation of the PDCP status report, and
   the cell identifier information comprises information about an identifier of a cell which is released from the user equipment and related to the cause of the generation of the PDCP status report.

2. The method of claim 1, wherein:
   the PDCP SDUs are received by the macro eNB via an external packet data network, and
   the part of the PDCP SDUs are transmitted to a radio link control (RLC) layer of the small eNB.

3. The method of claim 1, further comprising receiving a not-received PDCP SDU again from the macro eNB.

4. The method of claim 3, wherein the not-received at least one PDCP SDU is retransmitted by the macro eNB based on the PDCP status report.

5. The method of claim 1, wherein the part of the PDCP SDUs is determined by the macro eNB based on the information about the channel state.

6. A method of retransmitting, by a macro evolved-NodeB (eNB), data in a wireless communication system supporting dual connectivity, the method comprising:
   sending a part of packet data convergence protocol (PDCP) service data units (SDUs) to a radio link control (RLC) layer of a small eNB;

receiving information about a channel state between a user equipment and the small eNB from the user equipment;

determining whether to release a connection between the user equipment and the small eNB based on the information about the channel state;

sending a radio resource control (RRC) connection reconfiguration message to the user equipment if it is determined that the connection between the user equipment and the small eNB is released; and receiving, from the user equipment, a PDCP status report comprising information about a sequence number of at least one PDCP SDU not received by the user equipment, wherein:

the PDCP status report further comprises at least one of PDCP status report generation cause information and cell identifier information, the PDCP status report generation cause information comprises information about a cause of a generation of the PDCP status report, and the cell identifier information comprises information about an identifier of a cell which is released from the user equipment and related to the cause of the generation of the PDCP status report.

7. The method of claim 6, further comprising a step of receiving the PDCP SDUs received by a packet data convergence protocol (PDCP) layer over an external the packet data network.

8. The method of claim 6, further comprising retransmitting at least one PDCP SDU not received by the user equipment.

9. The method of claim 8, wherein the at least one PDCP SDU not received by the user equipment is determined and the at least one PDCP SDU is retransmitted based on the PDCP status report.

10. The method of claim 6, wherein the part of the PDCP SDUs is determined based on the received channel state information.

11. A user equipment configured for receiving data again in a wireless communication system supporting dual connectivity data, the user equipment comprising:

a receiver configured to receive a part of packet data convergence protocol (PDCP) service data units (SDU) from a small eNB;

a processor configured to generate information about a channel state between the small eNB and the user equipment;

a transmitter configured to send the information about the channel state to a macro eNB, wherein the receiver is configured to receive a radio resource control (RRC) connection reconfiguration message from the macro eNB, the processor is configured to release connection with the small eNB based on the RRC connection reconfiguration message and generates a PDCP status report comprising information about a sequence number of at least one PDCP SDU which has not been received, the transmitter is configured to send the PDCP status report to the macro eNB, the PDCP SDUs are received by the macro eNB over an external packet data network, and the part of the PDCP SDUs is received by the reception unit through a radio link control (RLC) layer of the small eNB, wherein:

the PDCP status report further comprises at least one of PDCP status report generation cause information and cell identifier information, the PDCP status report generation cause information comprises information about a cause of a generation of the PDCP status report, and the cell identifier information comprises information about an identifier of a cell which is released from the user equipment and related to the cause of the generation of the PDCP status report.

12. The user equipment of claim 11, wherein:

the PDCP SDUs are received by the macro eNB over an external packet data network, and the part of the PDCP SDUs is transmitted to a radio link control (RLC) layer of the small eNB.

13. The user equipment of claim 11, wherein the receiver receives the not-received at least one PDCP SDU from the macro eNB.

14. The user equipment of claim 13, wherein the not-received at least one PDCP SDU is retransmitted by the macro eNB based on the PDCP status report.

15. The user equipment of claim 11, wherein the part of the PDCP SDUs is determined by the macro eNB based on the information about the channel state.

* * * * *